RE 25478
Feb. 3, 1959     P. M. GIRI DE TERAMALA     2,871,725
MECHANICALLY PROPELLED OR MECHANICALLY DRIVEN APPARATUS
Filed Jan. 6, 1956     3 Sheets—Sheet 1
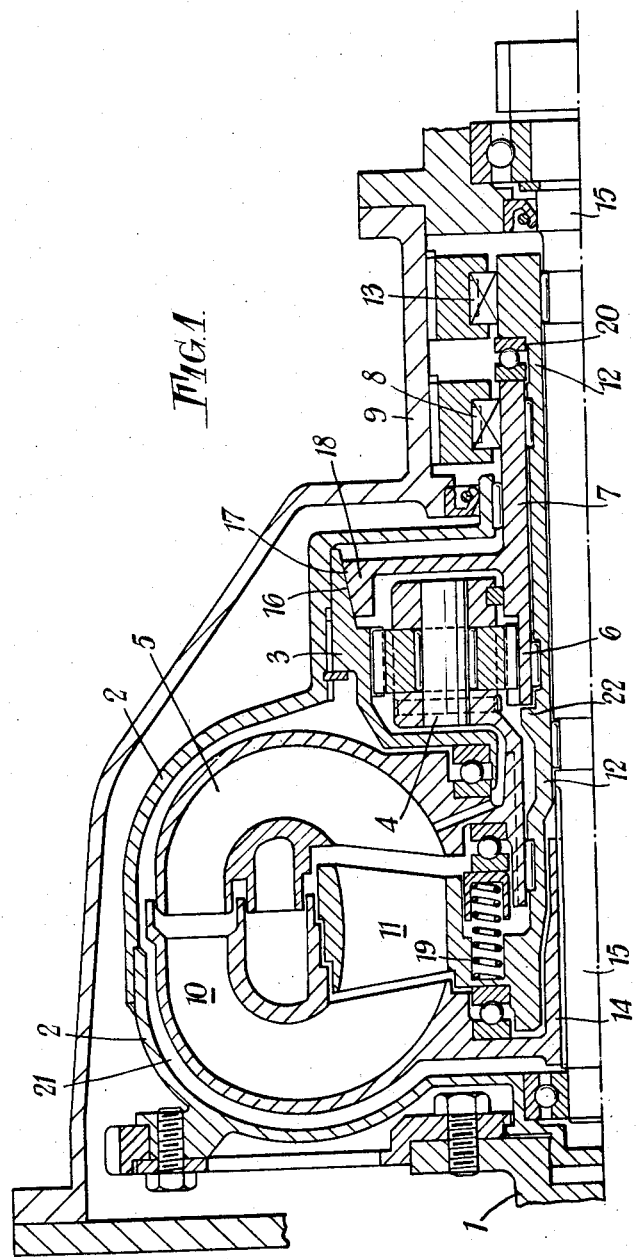

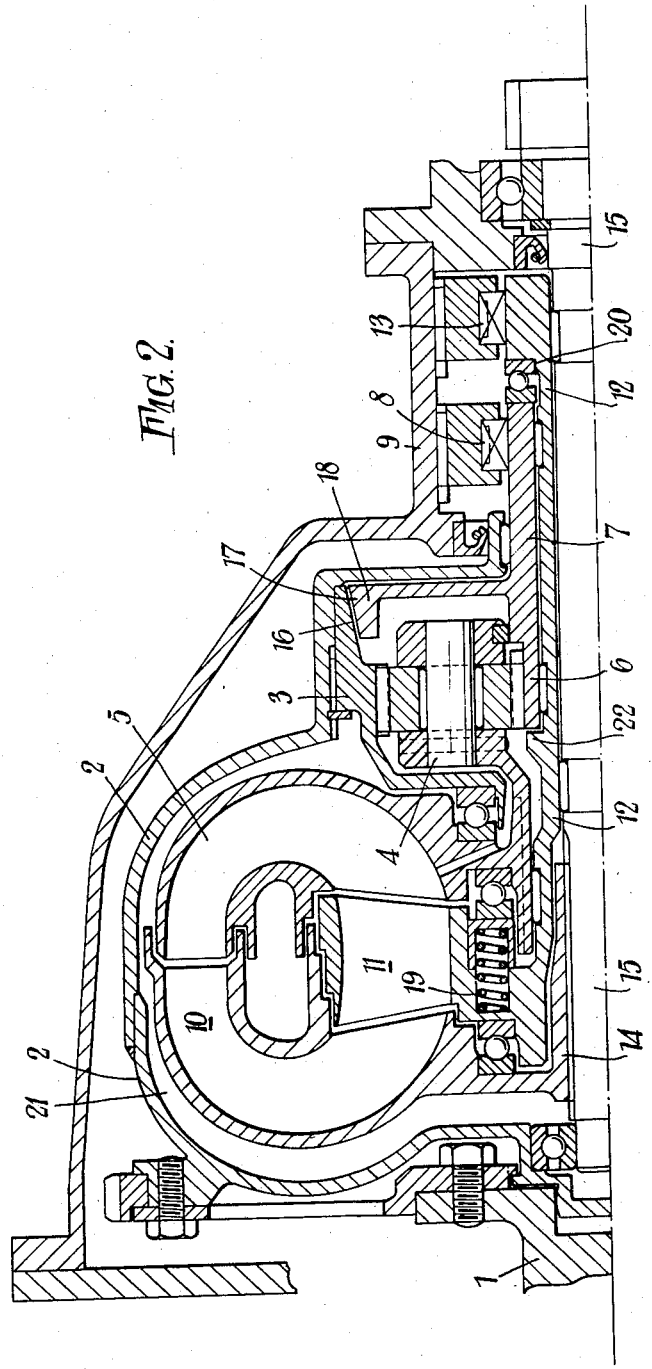

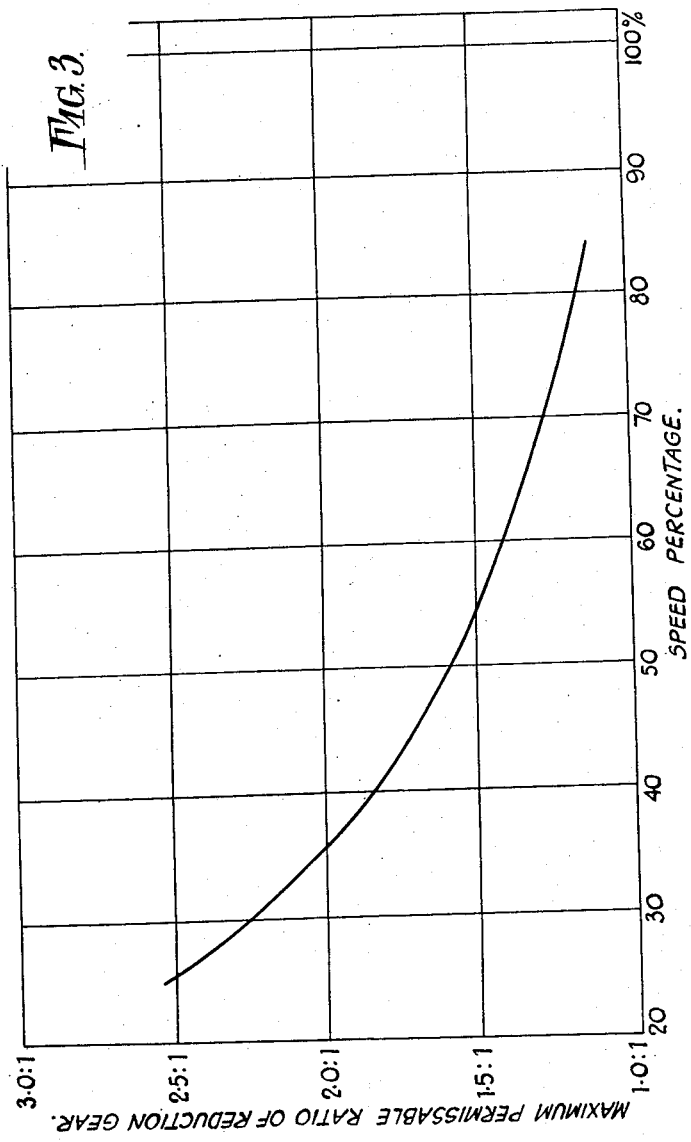

United States Patent Office 2,871,725
Patented Feb. 3, 1959

2,871,725

MECHANICALLY PROPELLED OR MECHANICALLY DRIVEN APPARATUS

Piero Mariano Giri de Teramala, Cox Green, England

Application January 6, 1956, Serial No. 557,757

Claims priority, application Great Britain March 1, 1955

4 Claims. (Cl. 74—677)

This invention relates to improvements in mechanically propelled or mechanically driven apparatus which is subject to variations in loads, for example motor vehicles, tractors, cranes and the like. Apparatus according to the present invention comprises a prime mover, a hydrokinetic torque converter and a mechanical change speed gear. The prime mover is generally but not exclusively an internal combustion engine. The hydro-kinetic torque converter comprises a vaned driving member or impeller, a vaned driven member or turbine driven by means of liquid circulating in a closed circuit and a vaned reaction member capable of rotation in the forward direction (i. e. in the same direction as the direction in which the impeller rotates) the arrangement being such that when the reaction member tends to rotate backwards but is held against such rotation the torque imparted by the hydraulic means to the turbine can be substantially greater than that imparted to the impeller and under other conditions is substantially the same as that imparted to the impeller. The mechanical change speed gear is preferably of the epicyclic type and is such that the gear can be made operative so that the power input shaft of the gear rotates faster than the power output shaft thereby producing an increased torque and the gear can be made inoperative so that the power input and power output shafts rotate at the same speed. Such a gear is hereinafter referred to as a "reduction gear."

According to this invention there is provided a mechanically propelled or mechanically driven apparatus comprising a suitable prime mover (i. e. one capable of developing a sufficient brake horse power over a sufficiently wide speed range for the purposes for which the apparatus is designed), a hydro-kinetic torque converter of suitable size and characteristics (as hereinafter defined) and a reduction gear interposed between the prime mover and the impeller of the torque converter, the ratio of the reduction gear being as hereinafter specified. Preferably the ratio of the reduction gear is not closer than 1.2:1 and is not wider than 2.24:1 and preferably the gear can be automatically rendered inoperative when the torque converter is transmitting power at a ratio of substantially 1:1 and automatically rendered operative when such ratio exceeds 1:1.

One embodiment of the invention in relation to a mechanically propelled vehicle will now be described by way of example with reference to the accompanying drawings in which:

Figure 1 is a cross-section of the transmission showing the gear in an inoperative condition.

Figure 2 is a similar cross-section showing the gear in an operative condition.

Figure 3 is a graph relating to the gear ratio.

The prime mover (not shown) is connected to the shaft 1 which is attached to the rotating casing 2 of the hydrokinetic torque converter, the casing 2 being attached to the annulus 3 of the epicyclic mechanical gear. The planet carrying cage 4 of the gear is attached to the impeller 5 of the torque converter. The sun element 6 of the gear is carried by a sleeve 7 and is prevented from rotating backwards by a free wheel device 8 interposed between the sleeve 7 and the fixed casing 9. The impeller 5 of the torque converter drives the turbine 10 by means of the liquid in the hydraulic circuit. 11 is the reaction member of the torque converter which reaction member is carried by a sleeve 12 which is prevented from rotating backwards by a free wheel device 13 interposed between the sleeve 12 and the fixed casing 9. The turbine 10 is mounted on a sleeve 14 which is splined to the power output shaft 15 which latter is connected to the road wheels in known manner. The turbine 10 is thus capable of axial movement relative to the power output shaft 15.

The annulus 3 has an internal conical face 16 adapted to co-operate with the external conical face 17 of a member 18 to form a friction clutch. Suitable friction material may be provided on one or other of the conical faces 16, 17. The member 18 is mounted on, or forms part of, the sleeve 7 and is therefore rigidly connected to the sun element 6. Springs 19 are accommodated in suitable cavities in the reaction member and are so positioned as to tend to move the reaction member 11 (and therefore the turbine 10 also) to the left as shown in Figure 1, the thrust being exercised against the impeller 5 and thence, through suitable thrust bearings, being absorbed within the apparatus. Movement of the reaction member 11 to the left causes corresponding movement of the sleeve 12 to the left which in turn causes movement of the sleeve 7 to the left, the thrust being imparted through the thrust bearing 20. This causes the member 18 to be moved to the left relative to the annulus 3 so that the clutch faces 16, 17 engage and cause the annulus and the sun element of the gear to be clutched together, thereby rendering the gear inoperative, as shown in Figure 1. The gear will now transmit power at 1:1.

If pressure develops in the region 21 of the torque converter it will cause the turbine to act as a piston and will tend to push the turbine 10 (and therefore the reaction member 11 also) to the right the springs 19 being compressed. When this occurs the sleeve 12 will move to the right and by reason of a shoulder 22 on the sleeve 12, which shoulder engages with the left hand end of the sleeve 7, will cause sleeve 7 to move to the right. The member 18 will then be carried to the right and the clutch 16, 17 will disengage.

The operation is as follows:

Assuming the prime mover and the vehicle to be stationary, the parts will be in the positions shown in Figure 1. If now the prime mover is started but a substantial starting load resists the rotation of the power output shaft 15, a substantial relative rotational speed will occur between the turbine 10 on the one hand and the rotating casing 2 and the impeller 5 on the other. This relative rotation causes a pressure to be generated in the liquid of the hydraulic circuit in the region 21. This will cause the turbine to move axially to the right and thereby disengage the clutch 16, 17. The sun element 6 will tend to rotate backwards but will be held against backwards rotation by the free wheel device 8. The gear will now be operative and the torque imparted to the impeller 5 will be greater than that produced by the prime mover. This will cause the prime mover (and therefore the casing 2) to rotate still faster relative to the stationary turbine 10. This will increase the pressure in the region 21 and will ensure that once the clutch 16, 17 starts to slip it is at once caused to disengage fully so that there is no undue wear on the clutch faces 16, 17. The parts will now be in the position shown in Figure 2. As the prime mover is accelerated, an increasing torque will be imparted to the turbine and the vehicle will start. Assuming it is desired to accelerate the vehicle to its maximum speed as quickly as possible the prime mover will be controlled to give the maximum power output of which it is capable and its torque will be increased by the gear, such increased torque being imparted to the impeller 5. Furthermore the load on the prime mover will be less than if no reduction gear were interposed between it and the impeller so that the prime mover will rotate faster and, in general, develop a greater horsepower. Consequently, by reason of the gear, there will be a greater torque input and a greater power input to the torque converter and the latter will therefore continue to act as a torque converter at a higher speed of the turbine than it otherwise would. While torque conversion continues to take place the gear will remain operative.

Assuming now that the driver no longer wishes to accelerate, or to drive at a speed approaching the maximum, he will reduce the power output from the prime mover and when this is sufficiently reduced the torque converter will transmit power at 1:1. The pressure in the region 21 will drop and the springs 19 will cause the clutch 16, 17 to re-engage and the parts will again assume the position shown in Figure 1. The gear also will now transmit power at 1:1 and there will be an overall transmission of power at 1:1. When the reaction member 11 tends to rotate forwards, as it will do when the torque converter is transmitting power substantially at 1:1, it is free to do so by reason of the free wheel device 13.

While mechanism as above described will always operate in the manner stated, in order that the power transmission apparatus shall be advantageous in relation to the particular prime mover so as to compare favourably with previously known methods of power transmission it is essential that the hydro-kinetic torque converter shall be of suitable size and construction in relation to the particular prime mover and that the ratio of the mechanical gear shall also be appropriate both to the prime mover and to the torque converter.

The size and characteristics of the prime mover will be chosen according to the work the apparatus is intended to perform and this choice will be based upon well understood engineering principles. In apparatus according to this invention the size and construction of the hydro-kinetic torque converter will be such that, if the prime mover were directly coupled to the impeller of the torque converter without the interposition of any gear and caused to rotate at the maximum speed of which it is capable while the turbine is held stationary (which maximum speed is hereinafter called "the stalling speed"), then the prime mover would attain a stalling speed not less than about 30% and not more than about 75% of the speed at which it develops its maximum brake horsepower (which latter speed is hereinafter called "the optimum speed"). The percentage ratio which the maximum speed, at which the prime mover can rotate when directly coupled to the torque converter with the turbine held stationary, bears to the optimum speed is hereinafter called "the speed percentage."

The larger the torque converter, the more efficiently will it transmit power at the ratio of 1:1, but the lower will be the speed at which torque conversion ceases and drive takes place at substantially 1:1 only, thereby possibly resulting in the prime mover being unable to develop its maximum horsepower under conditions of speed and load at which this is desirable. If it is desired that the apparatus shall during the greater part of its working operate with a power transmission ratio of 1:1, a torque converter of such size and construction as to give a comparatively low speed percentage will be chosen. If it is desired that the power transmission shall operate to increase the torque of the prime mover over a wide range of speeds, a torque converter of such size and construction as to give a comparatively high speed percentage will be chosen. In the case of a conventional automobile having a cylinder capacity of about 2 litres and a brake horsepower of about 70 a torque converter which gives a speed percentage of 55% is satisfactory. In the great majority of cases the torque converter will be such that the speed percentage is not below 30% nor greater than 75% but in exceptional cases it may be advantageous to use a torque converter giving a speed percentage a little less than 30% (but never less than 25%) or a little more than 75% (but never more than 80%). A torque converter of suitable size and construction for the purposes of this invention is one which gives a speed percentage within the range specified in this and the preceding paragraph.

The reduction gear interposed between the prime mover and the impeller will in most cases provide a ratio not closer than 1.2:1, for the loss of efficiency mechanical complications and additional expense that inevitably result from the provision of such a gear are in most cases not justified unless the gear has an operative ratio at least as wide as 1.2:1. In exceptional cases, however, when the torque converter is such as to give a speed percentage exceeding 75%, a slightly closer gear ratio may be used. On the other hand the gear ratio must not be so wide that with the gear operative and the turbine held stationary the prime mover can be caused to rotate at a speed exceeding its optimum speed and this imposes an overriding limit to the width of the gear ratio which is applicable in every case.

In apparatus according to this invention the maximum permissible width of the gear ratio must be related to the speed percentage in the manner shown in the graph set out in Figure 3. Thus if the speed percentage is 55% the gear ratio must not be wider than 1.5:1 and will lie between 1.2:1 and 1.5:1. The actual ratio will be chosen according to whether it is desired to be able to produce torque conversion at a high speed (in which case a comparatively wide ratio is chosen) or whether it is preferred that drive shall always take place at 1:1 above a relatively lower speed (in which case a closer ratio is chosen). As shown in the graph of Figure 3 the maximum permissible width of the gear ratio in the case of certain speed percentages is as follows:

| Speed percentage: | Maximum width of gear ratio |
|---|---|
| 30% | 2.24:1 |
| 45% | 1.71:1 |
| 55% | 1.5:1 |
| 65% | 1.34:1 |
| 75% | 1.215:1 |

In apparatus according to this invention the ratio of the reduction gear must lie within the limits specified in this and the preceding paragraph.

It will be understood that the requirements of an apparatus according to this invention set out in the preceding five paragraphs are applicable to every embodiment of this invention, whereas the constructional details described with reference to Figures 1 and 2 are by way of example.

Several apparatus according to this invention may have, respectively, different prime movers, each differing as regards torque and brake horsepower, but may nevertheless all have identical hydro-kinetic torque converters, satisfactory performance and efficiency being obtained by suitably choosing in each case the ratio of the reduction gear interposed between the prime mover and the impeller of the torque converter within the limits hereinbefore specified.

I claim:

1. Mechanically propelled or mechanically driven apparatus comprising a prime mover, a power input shaft, a power output shaft, a hydro-kinetic torque converter comprising a vaned driving member or impeller, a vaned driven member or turbine driven by liquid circulating in a closed circuit within a rotatable casing and a vaned reaction member rotatable in the same direction as said impeller, said casing being fixed to said power input shaft, planetary reduction gearing having an annulus fixed to said casing, a planet carrier attached to said impeller and a sun gear carried by a first sleeve, a fixed housing for said torque converter, a free wheel interposed between said first sleeve and said fixed housing for preventing backward rotation of said sun gear, a second sleeve coaxial with said first sleeve and carrying said reaction member, a free-wheel device interposed between said second sleeve and said fixed housing for preventing backward rotation of said reaction member, a third sleeve carrying said turbine and splined to said power output shaft to permit axial movement of said turbine relative to said power driven shaft, an internal friction face on said annulus cooperating with an external friction face on a member associated with said first sleeve to form a rigid connection with said sun element, cavities in said reaction member having springs disposed therein for moving said reaction member and said turbine axially in one direction for coupling together said annulus and said sun gear to render said reduction gear inoperative so that power is transmitted from said prime mover to said power output shaft at a substantially 1:1 ratio, an abutment on said second sleeve engageable with said first sleeve responsive to fluid pressure developed within said torque converter to automatically move said first sleeve axially in the opposite direction to effect disengagement of said friction faces so that the reduction gear becomes operative.

2. Mechanically propelled or mechanically driven apparatus as claimed in claim 1 and wherein said prime mover is capable of developing a sufficient brake horse power over a sufficiently wide speed range for which the apparatus is designed, said hydro-kinetic torque converter being of such size and construction that said prime mover has a stalling speed which is never less than 25% and never more than 80% of the optimum speed.

3. Mechanically propelled or mechanically driven apparatus as claimed in claim 1 and wherein the ratio of said reduction gearing is at least as wide as 1.2:1 and not so wide that with said reduction gearing operative and said turbine held stationary said prime mover can be caused to rotate at a speed exceeding its optimum speed.

4. Mechanically propelled or mechanically driven apparatus as claimed in claim 1 and wherein the ratio of said reduction gearing is not closer than 1.2:1 and is not wider than 2.24:1.

References Cited in the file of this patent
UNITED STATES PATENTS 2,324,703    Hoffman  ---------------  July 20, 1943